(12) United States Patent
Birnbrich et al.

(10) Patent No.: US 6,583,250 B2
(45) Date of Patent: *Jun. 24, 2003

(54) POLYOLEFINE MATERIALS WITH IMPROVED ADHESIVITY

(75) Inventors: Paul Birnbrich, Solingen (DE); Herbert Fischer, Duesseldorf (DE); Manfred Gorzinski, Duesseldorf (DE); Thomas Huver, Duesseldorf (DE)

(73) Assignee: Henkel Kommanditgesellschaft auf Aktien, Duesseldorf (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 88 days.

(21) Appl. No.: 09/194,219
(22) PCT Filed: May 9, 1997
(86) PCT No.: PCT/EP97/02395
§ 371 (c)(1), (2), (4) Date: Nov. 20, 1998
(87) PCT Pub. No.: WO97/44386
PCT Pub. Date: Nov. 27, 1997

(65) Prior Publication Data
US 2001/0009954 A1 Jul. 26, 2001

(30) Foreign Application Priority Data
May 20, 1996 (DE) .......................... 196 20 266

(51) Int. Cl.$^7$ ................................ C08F 32/08
(52) U.S. Cl. .................. 526/259; 526/88; 526/204; 526/217; 526/259; 526/260; 524/95; 524/99; 524/102; 524/103; 524/141; 524/171; 524/186; 524/243; 525/265; 525/274; 525/281
(58) Field of Search ................... 526/310, 248, 526/88, 204, 259, 260; 524/210, 95, 99, 102, 103, 141, 171, 186, 243; 525/265, 274, 276, 281, 285; 156/314

(56) References Cited

U.S. PATENT DOCUMENTS

| 3,862,265 A | 1/1975 | Steinkamp et al. ..... 260/878 R |
| 3,953,655 A | 4/1976 | Steinkamp et al. ......... 428/474 |
| 4,001,172 A | 1/1977 | Steinkamp et al. ...... 260/42.18 |
| 4,178,280 A | 12/1979 | Hill ....................... 260/45.8 A |
| 4,785,034 A | 11/1988 | Gaku et al. .................... 524/99 |
| 5,037,867 A | 8/1991 | Ravichandran et al. ........ 524/92 |
| 5,268,114 A | 12/1993 | Odorisio et al. ........ 252/51.5 A |
| 5,346,975 A | * 9/1994 | Aoshima et al. ............. 526/263 |
| 5,561,178 A | 10/1996 | Prabhu ........................ 524/95 |
| 5,837,092 A | * 11/1998 | Grieves et al. ............. 156/314 |
| 5,934,011 A | * 8/1999 | Ishioka et al. ............... 47/1.01 |
| 5,994,464 A | * 11/1999 | Ohsawa et al. ................ 525/85 |

FOREIGN PATENT DOCUMENTS

| DE | 50 947 | 1/1966 |
| DE | 40 17 801 | 12/1991 |
| DE | 4017801 A1 | * 12/1991 |
| DE | 43 16 585 | 11/1994 |
| EP | 0 295 930 | 12/1988 |
| EP | 0295930 | * 12/1988 |
| EP | 0 311 723 | 4/1989 |
| EP | 0 485 598 | 5/1992 |
| EP | 0 540 180 | 5/1993 |
| FR | 2 656 620 | 7/1991 |
| WO | WO88/10289 | 12/1988 |
| WO | WO94/15981 | 7/1994 |

* cited by examiner

Primary Examiner—Tatyana Zalukaeva
(74) Attorney, Agent, or Firm—John E. Drach; Henry E. Millson, Jr.

(57) ABSTRACT

The bondability of a polyolefin, particularly to cyanoacrylate adhesives, is improved by incorporating in the polyolefin a polymerization initiator capable of initiating the polymerization of the monomers constituting the cyanoacrylate adhesive. The polymerization initiator may, for example, be a sterically hindered nitrogen base and may be mixed with the polyolefin at a temperature above the polyolefin's glass transition temperature using, for example, co-extrusion or co-injection methods.

4 Claims, No Drawings

POLYOLEFINE MATERIALS WITH IMPROVED ADHESIVITY

FIELD OF THE INVENTION

This invention relates to polyolefins having improved bondability, for example by cyanoacrylate adhesives, through the incorporation of polymerization initiators, more particularly sterically hindered bases, such as diazabicyclo[5.4.0]undec-7-ene (DBU) and 1,5-diazabicyclo[4.3.0]non-5-ene (DBN). The present invention also relates to a process for improving the bondability of polyolefins, for example by incorporation of polymerization initiators in the polyolefin compound during extrusion or injection.

BACKGROUND OF THE INVENTION

Whereas plastics based on polyolefins, such as polyethylene or polypropylene, are now widely used in the manufacture of utility goods by virtue of their favorable price and their excellent material properties, their processing behavior is generally characterized by a deficiency which has already been the subject of numerous studies. The low polarity of the macromolecules, which generally consist solely of hydrocarbons, results in a material surface with little surface energy.

It is known that moldings and films of plastics, more particularly plastics belonging to the above-mentioned group of polyolefins with a non-polar surface, do not readily lend themselves to protective, decorative or informative surface modifications, for example in the form of lacquering, bonding or printing. To accommodate surface modifications such as these, the particular molding generally has to be subjected to one or more pretreatment steps which normally lead to a modification of its surface structure. These include, for example, the pretreatment of the particular plastic, more particularly polyethylene or polypropylene, with chlorinated polyolefins. Pretreatments such as these are expensive, involve a separate production step and increase the production costs of the end product.

In order for example to increase the adhesion of conventional polyurethane coatings to polyolefin materials, the surfaces of the moldings are oxidatively polarized by plasma treatment. Depending on the geometry of the moldings, however, this form of surface treatment is not always successful because irregularly shaped moldings in particular are difficult to expose to a uniform plasma concentration which leads to uneven surface modification. This in turn results in lacquer films of irregular structure which, besides an unsatisfactory appearance, generally lack stability and, accordingly, do not meet the quality requirements which the workpiece is expected to satisfy.

Further efforts to improve the surface polarity of polyolefins have been made. For example, attempts have been made to graft polypropylene with unsaturated carboxylic acids or anhydrides. To this end, efforts have been made to produce initiator sites for radical polymerization on the polymer chain by peroxides so that the acids or anhydrides could then be grafted on at those sites. However, only a limited number of polar groups could be introduced into the polypropylene in this way because the oxidative modification of the polymer chain resulted in dramatic losses in regard to the stability of the workpiece.

To improve the surface properties of polyolefins, EP-A1 311 723 proposes incorporating a modified polypropylene resin grafted with unsaturated dicarboxylic acids in the polyolefin.

In particular, the class of so-called "instant adhesives" (hereinafter also referred to in short as adhesives) so attractive to the consumer have not yet been considered for use in conjunction with polyolefins because the adhesive—which generally consists mainly of cyanoacrylate monomers—on the one hand showed inadequate adhesion and, on the other hand, was slow to cure.

α-Cyanoacrylate adhesives have acquired increasing significance in recent years in the field of industrial adhesives. Apart from the fact that they can largely be formulated as one-component solventless adhesives, α-cyanoacrylate adhesives have an unusual curing rate of—in some cases—just a few seconds. Depending on their formulation, the low-viscosity adhesives are able to fill narrow gaps and thus provide for whole-surface bonding between various substrates. However, adhesive bonding such as this presupposes that the surface of the materials to be joined makes polymerization initiators available in sufficient numbers to initiate curing of the adhesive. In general, substrates with a polar surface contain molecule residues with free electron pairs and/or water molecules which are capable of initiating polymerization of the adhesive. In the absence of these initiators, the adhesive is unable to cure and to form a durable bond between the substrates. Attempts have been made to overcome this disadvantage by using so-called primers, i.e. by applying coupling agents to the surface of the polyolefin.

Thus, DE-A1 43 16 585, for example, describes a process for improving the adhesion properties of polyolefins with respect to water-based dispersion adhesives by application of an aqueous copolymer dispersion based on vinyl acetate and ethylene to the surface of the polyolefin.

In its preamble, DD-PS 50 947 discloses that efforts to modify the surface properties of polyolefins by incorporation of relatively low molecular weight additives, such as fatty acid amides or condensation products of alkylene oxides and fatty alcohols, had resulted in permanently reduced deteriorations in the mechanical properties of the materials thus joined.

DE-A1 40 17 801 describes the use of imidazoline derivatives in primers which are applied to the surface of polyolefins to improve their adhesion properties.

WO 88/10289 proposes the use of sterically hindered bases, such as diazabicyclo(5.4.0)undec-7-ene (DBU) for example, for priming the surface of polyolefins and materials produced from them.

Unfortunately, the efforts described in the foregoing to modify the surface of polyolefins have a number of disadvantages which, hitherto, appeared irreversible. Either the plastics could not be durably bonded by cyanoacrylate adhesives with their particularly favorable performance properties and their durable mechanical bonds or the process for improving surface properties to be additionally integrated in the production process added enormously to the cost of the material and could not be conveniently applied.

SUMMARY OF THE INVENTION

The problem addressed by the present invention was to provide polyolefins of which the surface would be modified in such a way that so-called "instant adhesives", generally based predominantly on cyanoacrylate monomers, could be used to bond the polyolefins to various substrates. In particular, this effect would be achieved without adversely affecting the mechanical properties of the polyolefin. To this end, it would be desirable or even necessary for the surface modification to affect only the surface of the workpiece and those layers lying immediately beneath its surface and to cause no adverse changes to the inner structure.

Another problem addressed by the present invention was to provide a process for the production of such polyolefins.

The problem addressed by the invention has surprisingly been solved by the addition of one or more additives capable of initiating curing of the adhesive to the polyolefin during its extrusion or injection, i.e. during its processing to the final molding. The additives affect the mechanical properties of the polyolefin to only a limited extent, if at all, and remain storage-stable in the plastic for relatively long periods. The polymerization initiators suitable for incorporation in the polyolefins are readily miscible therewith, but on the other hand have a polarity which enables polymerization of the adhesive monomers to be initiated.

Accordingly, the present invention relates to polyolefin compositions having improved bonding behavior which are obtainable by mixing at least 0.001% by weight, based on the polyolefin, of one or more polymerization initiators with the polyolefin at temperatures above its glass transition temperature, characterized in that the polymerization initiators are capable of initiating the polymerization of monomers corresponding to general formula (I):

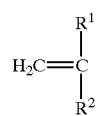

(I)

in which $R^1$ represents —CN or $COOR^3$, $R^2$ represents —CN, halogen or $COOR^3$ and $R^3$ represents hydrogen and/or linear or branched, saturated or unsaturated, like or different alkyl groups or cycloalkyl groups containing 1 to 22 carbon atoms or phenyl groups. In one preferred embodiment of the present invention, the polymerization process is ionic polymerization.

DETAILED DESCRIPTION OF THE INVENTION

Polyolefins in the context of the present invention are macromolecules which are generally obtainable by polymerization (radical polymerization or polymerization catalytically coordinated by a transition metal) of hydrocarbons containing at least one olefinically unsaturated double bond. Hydrocarbons such as these are, in particular, the polymerization products of short-chain olefins, such as for example polyethylene, polypropylene, poly(1-butene), polyisobutylene or poly(4-methyl-1-pentene). However, the present invention is equally applicable to the polymerization products of higher linear and/or branched, mono- and/or polyunsaturated olefins, copolymers and/or mixtures of the olefins and polyolefins mentioned also counting as polyolefins in the context of the present invention.

The polymerization of ethylene can be carried out, for example, by radical polymerization in high-pressure reactors under pressures of about 150 to 200 MPa and at average temperatures of about 200° C. or higher. Through chain transfer mechanisms, this form of reaction control produces so-called low-density polyethylene (LDPE) with densities of about 920 kg/m³ and molecular weights of about 60,000 to 120,000 ($M_w$).

Linear low-density polyethylene (LLDPE) and very-low-density polyethylene (VLDPE) can also be produced by high-pressure processes. These materials are normally transparent, white, flexible solids which can be processed to transparent and, in some cases, even slightly clouded/opaque films. In cases where completely transparent films or materials having mechanical, electrical or chemical properties modified in a predetermined manner are to be produced, the copolymerization of ethylene with comonomers such as, for example, vinyl acetate, methyl acrylate, ethyl acrylate, methyl methacrylate, methacrylic acid, styrene, vinyl chloride, propene, butene, isobutene or hexene has been successfully applied.

Polyethylenes of relatively high density can be produced, for example, in low-pressure reactors using transition metal catalysts. These include, for example, Phillips catalysts, such as quartz particles impregnated with chromium trioxide, or conceptionally similar compounds, such as for example bis(triphenylsilyl)chromate or Chromacen (dicyclopentadienyl chromium). The group of transition metal catalysts also includes Ziegler catalysts which generally contain titanium alkoxylates and long-chain aluminium alkyls. Unbranched polyethylenes with a marked tendency towards crystallization and, hence, high density can be produced with both groups of catalysts. The materials obtainable in this way are normally opaque white materials of low flexibility. The residual content of catalyst is normally about 20 ppm. The low-pressure production processes also allow copolymerizations, more particularly with monoolefins and/or unconjugated diolefins.

The various polyethylene types (LDPE, LLDPE and HDPE) cover different applications. Whereas LDPE and LLDPE are mainly used in films and coatings by virtue of their high flexibility, HDPE is used mainly for structural applications. In particular, aggressive liquids, for example acids or bleaches, can be accommodated in containers of HDPE. Accordingly, the preferred processing techniques include the drawing of films and tubes, the extrusion coating and also the blow molding and injection molding of the polymer melts.

Polypropylene, poly(1-butene) and polyisobutylene have similar applications. Poly(1-butene) in particular, by virtue of its unusual mechanical properties, is used in materials which are expected to combine high flexibility with a long useful life. High-performance polyolefins include poly(4-methyl-1-pentene) which is characterized by transparency, chemical resistance and favorable electrical properties.

The present invention solves the problem of conveniently bonding such polyolefin products not only to one another, but also to various different materials. The possibility of using so-called "instant adhesives", more particularly based on cyanoacrylates, for producing such adhesive bonds is particularly advantageous.

The adhesives to be used in accordance with the present invention normally consist of monomers corresponding to general formula (I):

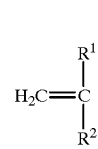

(I)

in which $R^1$ represents —CN or $COOR^3$, $R^2$ represents —CN, halogen or $COOR^3$ and $R^3$ represents hydrogen and/or linear or branched, saturated or unsaturated, like or different alkyl or cycloalkyl groups containing 1 to 22 carbon atoms or phenyl groups, which are capable of polymerizing by ionic mechanisms. The polymerization initiators normally used are weak bases although even water or alcohols are capable of initiating the polymerization reaction.

Monomers which contain —CN as $R^1$ and —COOR$^3$ as $R^2$ ($R^3$ being as defined above) are particularly suitable for use as adhesives in accordance with the present invention. Examples of such monomers are methyl-2-cyanoacrylate, ethyl-2-cyanoacrylate, n-propyl-2-cyanoacrylate, isopropyl-2-cyanoacrylate, n-butyl-2-cyanoacrylate, tert.butyl-2-cyanoacrylate, sec.-butyl-2-cyanoacrylate, n-pentyl-2-cyanoacrylate, isopentyl-2-cyanoacrylate, n-hexyl-2-cyanoacrylate, n-heptyl-2-cyanoacrylate, n-octyl-2-cyanoacrylate, cyclohexyl-2-cyanoacrylate, allyl-2-cyanoacrylate, ethoxyethyl-2-cyanoacrylate, trifluoropropyl-2-cyanoacrylate, 2-chloroethyl-2-cyanoacrylate, 2,2,2-trifluoroethyl-2-cyanoacrylate and 2-trifluoromethyl-2-cyanoacrylate.

Typical additives described hereinafter, for example polymerization inhibitors, may be incorporated in the adhesive monomers to prolong the storage life of the adhesive or the duration of the polymerization reaction. Besides the usual anionic polymerization route, the adhesive monomers are also generally capable of polymerization by a radical mechanism. In order, therefore, to obtain an adhesive formulation with a long storage life, inhibitors both for delaying the anionic polymerization and for preventing radical polymerization should be present.

Normally, the anionic polymerization of cyanoacrylate monomers only takes place at pH values above 5.5. Accordingly, suitable inhibitors are Lewis acids. Acidic gases, for example sulfur dioxide, which circulate in the reactor during production of the monomers have proved to be particularly effective in this regard. In some cases, the presence of small quantities of water can also contribute towards stabilizing the adhesive formulation. Such small quantities of water are capable of accelerating the hydrolysis of the acrylate, so that the quantity of acrylic acid additionally released leads to a reduction in the tendency towards polymerization.

Other polymerization inhibitors may be added to the adhesive formulation, for example in the form of sulfonic acids, sultones, carboxylic acids and/or carboxylic anhydrides. Sulfuryl chloride, sultones, for example 1,8-naphthosultone, propane sultone, butane sultone, monochlorotolyl sultone or 3,3,5,5-tetramethyl butane sultone, and anhydrides can have an additional stabilizing effect by chemically combining any co-condensed water present so that it no longer acts as a polymerization initiator. Equally effective and, in some cases, far less damaging to health are the sulfonic anhydrides and the sulfocarboxylic anhydrides, for example carboxylic anhydrides of sulfopropionic acid, sulfoisobutyric acid or sulfopivalic acid.

The monomers are also stabilized by the addition of alkyl sulfides, alkyl sulfates, alkyl sulfites, sulfones, sulfoxides and mercaptans during the production process.

Besides the polymerization inhibitors, the adhesives may also contain fillers of which the principal function is to modify their rheological properties because the cyanoacrylates are generally low-viscosity materials. A correspondingly modified viscosity is particularly desirable in regard to the ability of the adhesives to fill relatively large gaps between the substrates to be bonded. Suitable fillers are, for example, poly(ethyl-2-cyanoacrylate), polymethyl methacrylate (PMMA), cellulose esters, polyvinyl methyl ethers, tris-(hydroxyalkyl)-cyanuric and phosphonic acid, polycarbonates, polyvinylidene fluorides, polyethylene, acrylate elastomer copolymers or heated PMMA. Other fillers for modifying impact strength include, for example, polycarboxylic acids, such as 1,1,2,2-ethylene tetracarboxylic acid or thiodisuccinic acid, or lactones, such as butyrolactone, pivalolactone, γ-caprolactone, carbethoxybutyrolactone, phthalide lactone, coumarin lactone or ε-caprolactone. Solid mineral fillers, such as quartz, aluminium oxide or calcium carbonate, can also provide the adhesives with advantageous properties. Maleic anhydride may be added to improve thermal stability and/or tensile strength. By mixing with heat-activatable radical polymerization initiators, the adhesive bond can be strengthened by subsequent heating. Other additives include, for example, maleic acid dimethyl ester, maleic acid diethyl ester, maleic acid dipropyl ester, maleic acid dibutyl ester, maleic acid diallyl ester, fumaric acid dimethyl ester, fumaric acid diethyl ester, fumaric acid dipropyl ester, bis-(2-ethylhexyl)-fumarate, didodeceyl maleate. The function of these additives is not only to exert a plasticizing effect, but also to reduce the acrylate content of the starting material. Other plasticizers include aryl aryl or aryl alkyl ethers, the alkyl moiety normally consisting of a linear or branched, saturated or unsaturated alkyl chain containing 1 to 22 carbon atoms.

The adhesive composition as a whole contains the adhesive monomers, for example cyanoacrylate, in quantities of about 85 to 99% by weight, based on the adhesive composition as a whole, the rest of the composition generally consisting of typical additives.

In principle, any free bases, including for example weak bases, such as water, alcohol, organic amines or inorganic or organic phosphites, and stronger bases, for example the carboxylate or hydroxy anion, are suitable for initiating the polymerization of monomers corresponding to formula (I). The bases initiate the polymerization immediately on contact. In view of the presence of polymerization inhibitors, it is desirable for the contact surface between the adhesive and the initiator(s) to be as large as possible. According to the invention, optimal contact between the adhesive and the initiator(s) can be achieved if the initiators are distributed uniformly densely over the surface of the substrate(s) to be bonded. This is best achieved by co-extrusion or co-injection of the polyolefin component, i.e. the material to be bonded later, with the polymerization initiator. In general, this does not involve an additional process step because almost all molding processes are normally preceded by an extrusion step or extrusion-like step, for example injection molding.

According to the invention, the problem of modifying the surface without affecting underlying layers of the material is solved by the fact that the polymerization initiators have a so-called "blooming effect". The expert understands blooming to mean the tendency of low molecular weight substances embedded in a polyolefin matrix to migrate to the surface of the surrounding material. The effect of blooming is that, for the most part, the polymerization initiators added collect at or directly below the surface of the workpiece thus produced during the extrusion or injection process. An outer jacket-like layer with a high density of polymerization initiators is created in this way while the inner core of the workpiece remains large freely from foreign material and retains its original material properties. An effect such as this can only be achieved if the polymerization initiators used are limited in regard to their molecular weight. On the one hand, mixtures of high molecular weight materials differing widely in their polarity are extremely difficult to homogenize; on the other hand, the mobility of the polymerization initiators in the polyolefin melt decreases drastically with increasing molecular weight. However, inadequate homogeneity and hence poor distribution of the initiators in the material surface leads to zones with uneven adhesion properties after bonding, whereas inadequate mobility suppresses migration to the polymer surface. As a result, the concentration of initiator in the workpiece can sometimes be so high that the original material properties are affected or are even lost in the form of a reduction in quality. It is therefore of advantage to limit the maximum molecular weight of the initiator to about 2,000 atomic mass units (amu). The permitted lower molecular weight determined by the volatility of the initiator is generally about 70 amu. Advantageous embodiments comprise in particular polymerization initiators with molecular weights of 80 to 1,000 and, more particularly, about 90 to 500 amu. Particularly preferred initiators have molecular weights of about 100 to 300 and, more particularly, 110 to about 220 amu.

Polymerization initiators suitable for the purposes of the invention generally contain a nitrogen atom, an oxygen atom, a sulfur atom or a phosphorus atom, initiators containing combinations of one or more of these features also being effective in the context of the invention. The requirements which catalyst systems such as these have to satisfy for use in accordance with the invention include not only their ability to initiate the anionic polymerization of the adhesive monomers, but also an ability to migrate to the surface of the material to support a firm bond between the surface of the material and the adhesive molecules. Nitrogen bases are particularly suitable for this purpose, so that the invention also encompasses polyolefins which contain nitrogen bases as polymerization initiators and a process for their production.

Organic amines, particularly those incorporated in an aromatic, aliphatic or cycloaliphatic system, have proved to be particularly advantageous. Organic amines such as these include, for example, such substances as trialkylamines where the alkyl chains may be the same or different, linear or branched and saturated or unsaturated and each alkyl chain generally contains from 1 to 22 carbon atoms, although the total number of carbon atoms should be at least 6.

Nitrogen bases of which the nitrogen atom is part of an aliphatic or aromatic ring system are particularly suitable. In their case, too, it is important to ensure that the volatility of the initiators is not too high because otherwise the stability in storage of the materials treated in accordance with the invention would be too low. However, if the time intervals between the production of the molding/film to be bonded and the actual bonding step are only short, the volatility of the initiator may readily be even higher. In order to adapt both polarity and volatility, the molecules used may be provided with suitable substituents. Examples of suitable substituents are linear or branched, saturated or unsaturated alkyl groups containing 1 to 24 carbon atoms, acyl groups containing 2 to 24 carbon atoms, hydroxyalkyl groups, alkylamino groups and/or alkyl mercaptans, the compatibility between the polyolefin substrate and the polymerization initiator increasing and hence the tendency for the initiator to "bloom" decreasing with increasing length of the alkyl chain.

Initiators from the group of imidazolines, imidazolinones and polyazapolycycles are particularly suitable for the purposes of the invention. Imidazolines and/or imidazolinones substituted in the 2-position in particular may readily be incorporated in polyolefin materials in accordance with the invention. However, polymerization inhibitors in the form of so-called sterically hindered nitrogen bases, such as for example 1,8-diazabicyclo(5,4,0)undec-7-ene (PBU) and/or 1,5-diazabicyclo(4,3,0)non-5-ene (DBN), are most particularly preferred.

The quantity of initiators required to initiate the adhesive molecules can vary according to the polyolefin used and the initiator used. In general, however, it may be assumed that quantities of 0.005 to 20% by weight, based on the polyolefin, are sufficient so far as the initiator effect is concerned. Normally, 10% by weight would be sufficient as an upper limit although, in general, even quantities of 0.01 to 5% by weight of initiator are sufficient to obtain the effect according to the invention. In one particularly suitable embodiment, the initiators are used in quantities of 0.05 to 1% by weight.

The initiators may be added to the polyolefin materials in any form, although particularly good distribution is guaranteed by using either liquid initiators or fine-particle solids. It can be of advantage for the solid initiators to have melting or softening points lying within the temperature range required for processing the polyolefin.

The polymerization initiators may be added to the polyolefin materials at any stage of the processing cycle after the actual polymerization reaction. A particularly good time is the final processing of the polyolefins to films or moldings which is generally carried out by extrusion or by any other processing technique in the melt at temperatures above the glass transition temperature of the corresponding polymer, for example by injection processes. The polymerization initiators are added at elevated temperature and, for example, are co-extruded or co-injected. Any equivalent mixing and molding processes may of course also be used in accordance with the invention.

The process according to the invention is independent of the final three-dimensional shape of the polyolefin molding. The polymerization initiator may be introduced at any stage of the production cycle from granulation of the polyolefin to the final molding step. However, a particularly suitable time is the final molding step. Accordingly, the present invention also relates to moldings or films with improved bonding behavior which are based on polyolefins containing the described polymerization initiators.

The present invention relates to the use of 2-phenyl imidazoline, 1,8-diazabicyclo(5.4.0)undec-7-ene (DBU) and/or 1,5-diazabicyclo(4.3.0)non-5-ene (DBN) as polymerization initiators for the production of polyolefins with improved bondability by polyacrylates obtainable from monomers corresponding to general formula (I):

(I)

in which $R^1$ represents —CN or $COOR^3$, $R^2$ represents —CN, halogen or $COOR^3$ and $R^3$ represents hydrogen and/or linear or branched, saturated or unsaturated, like or different alkyl or cycloalkyl groups containing 1 to 22 carbon atoms or phenyl groups, characterized in that the polymerization initiators and the polyolefins are mixed at temperatures above the glass transition temperature of the polyolefins.

EXAMPLES

The following plastics were tested in order to evaluate bondability:
a) polyethylene: Lupolen H 1800 (BASF)
b) polypropylene: Hostalen PPH 1050 (Hoechst)

Extrusion Conditions:

The polymerization initiator and the polyolefin granules were thoroughly mixed and the resulting mixture was extruded in a twin-screw kneader (Brabender Plasticorder PL2000) with a screw diameter of 41.8 mm and a screw length of 7D. A slot die (0.5 mm tall, 50 mm wide) was used as the outlet opening. The tapes obtained were used for all other tests.

Tensile Shear Tests:

The tensile shear tests were carried out using Zwick testers. The extruded polyolefin tapes (0.5 mm thick, 40 mm wide) were bonded with cyanoacrylate (Pattex instant adhesive, Henkel KGaA) over an area of 250 mm$^2$ and tensile-shear-tested. The figures shown in the Tables represent averages of five individual measurements. In view of the high tensile shear values, material elongation or failure frequently occurred, above all in the case of polypropylene.
Z1=tensile shear value after one day (N/mm$^2$)
Z2=tensile shear value after storage for one week at 50° C. (N/mm$^2$)
Z3=tensile shear value after storage for two weeks at 50° C. (N/mm$^2$)

TABLE 1

Polypropylene

| Additive | Quantity added (% by weight) | Z1 | Z2 | Z3 |
|---|---|---|---|---|
| No addition | — | No adhesion, not bondable | No adhesion, not bondable | No adhesion, not bondable |
| 2-Phenyl imidazoline | 0.5 | 1.66 | 1.32 | No adhesion, not bondable |
| 2-Phenyl imidazoline | 0.1 | 1.17 | 1.26 | No adhesion, not bondable |
| DBU | 0.1 | 1.04 | 1.13 | 1.26 |
| DBN | 0.1 | 1.21 | 1.00 | 0.91 |

TABLE 2

Polyethylene

| Additive | Quantity added (% by weight) | Z1 | Z2 | Z3 |
|---|---|---|---|---|
| No addition | — | 0.28 | 0.28 | 0.28 |
| 2-Phenyl imidazoline | 0.1 | Material elongation, material failure | Material elongation, material failure | 0.28 |
| DBU | 0.05 | Material elongation, material failure | Material elongation, material failure | Material elongation, material failure |
| DBN | 0.5 | Material elongation, material failure | Material elongation, material failure | Material elongation, material failure |

We claim:

1. A polyolefin composition with improved bondability consisting essentially of
A) at least one polyolefin; and
B) at least 0.001% by weight, based on the polyolefin of at least one ionic polymerization initiator capable of initiating the polymerization of monomers corresponding to formula I

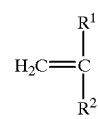

(I)

in which R$^1$ represents —CN or COOR$^3$, R$^2$ represents —CN or COOR$^3$, and R$^3$ represents hydrogen, a linear or branched, saturated or unsaturated, similar or different alkyl group or cycloalkyl group containing 1 to 22 carbon atoms or a phenyl group;
wherein components A) and B) have been mixed together at a temperature above the glass transition temperature of the polyolefin; and wherein the at least one ionic polymerization initiator is selected from the group consisting of imidazolines, imidazolinones and polyazapolycycles.

2. The polyolefin composition of claim 1, wherein the polymerization initiator is present in a quantity of from 0.005 to 20% by weight, based on the polyolefin.

3. The polyolefin composition of claim 1, wherein the polyolefin is selected from the group consisting of polyethylene, polypropylene, poly(1-butene), polyisobutylene, poly(4-methyl-1-pentene) and copolymers and mixtures thereof.

4. The polyolefin composition of claim 1, wherein the polymerization initiator has a maximum molecular weight of 2000 amu.

* * * * *